C. JAGAR.
SLIDING CASTER.
APPLICATION FILED JULY 15, 1915.
1,294,273.
Patented Feb. 11, 1919.
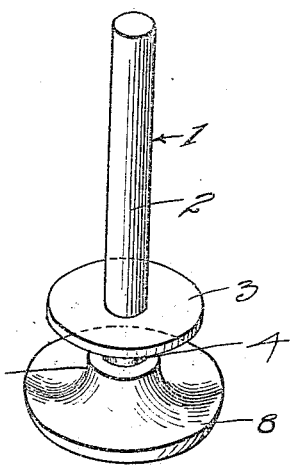
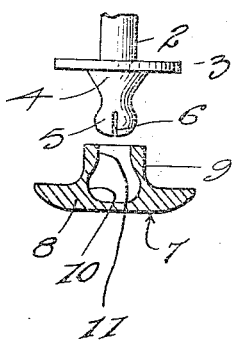
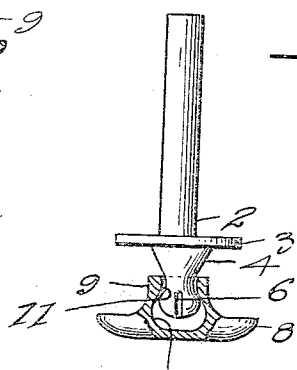
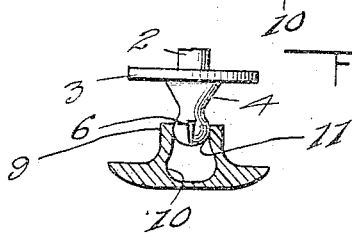

UNITED STATES PATENT OFFICE.

CARL JAGAR, OF NEW ROCHELLE, NEW YORK.

SLIDING CASTER.

1,294,273. Specification of Letters Patent. Patented Feb. 11, 1919.

Application filed July 15, 1915. Serial No. 40,046.

*To all whom it may concern:*

Be it known that I, CARL JAGAR, a subject of the Emperor of Austria-Hungary, residing at New Rochelle, in the county of Westchester and State of New York, have invented certain new and useful Improvements in Sliding Casters; and I do hereby declare the following to be a full, clear, and exact description of the invention, such as will enable others skilled in the art to which it appertains to make and use the same.

This invention relates to new and useful improvements in sliding casters and the principal object of the invention is to provide a device capable of being readily attached to tables, chairs and the like in order to render the same easily movable.

Another object of the invention is to provide a caster of the above character having a swiveled head, thereby reducing much of the resistance usually accompanying the moving of such articles.

A further object of the invention is to provide a novel means for holding the swivel in place and to eliminate the ordinary method of crimping.

A further and more specific object of the invention is to provide a caster, wherein the shank or stem is formed with an enlargement having a slot extending longitudinally therein, which slot allows the enlargement to be pressed inwardly so as to permit the device to be positioned in a socket and after it has reached its innermost position, the enlargement will spring outwardly, thereby preventing accidental loss of the shoe.

With these and other objects in view, the invention consists in the novel combination and arrangement of parts which will be fully set forth in the following specification and accompanying drawings, in which:—

Figure 1 is a perspective view showing this improved caster as it would appear assembled.

Fig. 2 is a view in elevation partly in section illustrating the assembled caster.

Fig. 3 is a view illustrating the same with the shank partially removed from the shoe, and Fig. 4 is a view illustrating the shank removed from the shoe.

Referring now to the drawings by characters of reference, the numeral 1 designates the shank of the caster comprising a stem 2 provided at its lower end with the flange 3. Formed on the under face of the flange 3 is the frusto-conical extension 4, which is concentric with the flange and is formed at its apex with an enlargement or head 5. This enlargement is formed with the slot 6, which extends transversely thereof and to a point substantially in line with the terminal of the frusto-conical member hereinbefore described.

The shoe of the caster is designated generally by the numeral 7 and comprises the body 8, which is circular in plan and is provided with the concentric collar 9 on its upper face. The body 8 is formed with an enlarged recess 10 and the collar 9 is provided with the constricted opening 11 which communicates with the recess and this recess and constricted opening respectively receive the head and neck of the stem 1.

From the foregoing it will be apparent that in use the head 5 is positioned in the recess by forcing the same through the restricted opening 9 and it will be evident that after the same has passed through the restricted opening, it will expand into the enlarged recess 10 as illustrated in Fig. 2. The shoe will then be held on the shank and it will be apparent that the same will be swivelly mounted thereby permitting a free movement of the shoe with relation to the shank.

While in the foregoing there has been shown and described the preferred embodiment of this invention, it is to be understood that such changes may be made in the combination and arrangement of parts as will fall within the spirit and scope of the appended claim.

What is claimed is:—

A sliding caster comprising, a stem; a flange carried by the lower end of the stem; an inverted frusto-conical extension depending from the lower side of said flange; an enlarged head carried by said frusto-conical extension and having a transverse slot therein; a shoe having a recess therein for receiving the head of said frusto-conical extension, and a collar formed on the upper side of said shoe and adapted to engage the lower portion of said frusto-conical extension to permit the free turning of said shoe.

In testimony whereof I affix my signature in presence of two witnesses.

CARL JAGAR.

Witnesses:
GEORGE E. GALGANO,
PHILLIP SUPPAN.

Copies of this patent may be obtained for five cents each, by addressing the "Commissioner of Patents, Washington, D. C."